United States Patent [19]

Macfarlane et al.

[11] Patent Number: 5,709,183
[45] Date of Patent: Jan. 20, 1998

[54] SHROUD AND COMBUSTION CHAMBER FOR AN INTERNAL COMBUSTION ENGINE

[75] Inventors: Glen R. Macfarlane, Howell; John R. Jaye, Northville, both of Mich.

[73] Assignee: Chrysler Corporation, Auburn Hills, Mich.

[21] Appl. No.: 774,286

[22] Filed: Dec. 23, 1996

[51] Int. Cl.⁶ ............................................ F02F 1/42
[52] U.S. Cl. ............................... 123/193.3; 123/188.7
[58] Field of Search ........................ 123/188.9, 188.7, 123/188.14, 193.3, 193.5

[56] References Cited

U.S. PATENT DOCUMENTS

| | | |
|---|---|---|
| 3,927,655 | 12/1975 | Goto et al. . |
| 4,354,463 | 10/1982 | Otani et al. . |
| 4,452,221 | 6/1984 | Keating . |
| 4,706,622 | 11/1987 | Cloke et al. . |
| 4,756,281 | 7/1988 | Chen et al. ................ 123/188.8 |
| 4,838,219 | 6/1989 | Feuling ...................... 123/188.14 |
| 4,919,092 | 4/1990 | Smith, Jr. et al. ........... 123/188.14 |
| 4,957,081 | 9/1990 | Ito et al. . |
| 5,230,310 | 7/1993 | Hashimoto ................. 123/188.8 |
| 5,601,061 | 2/1997 | Dam et al. ................. 123/188.8 |

*Primary Examiner*—Erick R. Solis
*Attorney, Agent, or Firm*—Kenneth H. MacLean

[57] ABSTRACT

The present invention provides an internal combustion engine combustion chamber with at least one shrouded exhaust valve. The combustion chamber is partially defined by a cylinder head having an exhaust port and a throat opening to the combustion chamber with an exhaust valve with an enlarged head portion cooperative with the throat to regulate exhaust flow therethrough. The exhaust valve shroud is formed by a projecting portion of the cylinder head interiorly of the combustion chamber and located adjacent to the exhaust valve. During the exhaust cycle of the combustion chamber, the shroud cooperates with the peripheral edge of the exhaust valve head to inhibit a direct flow of exhaust rich in unburned hydrocarbons between the surface of the shroud and the edge of the exhaust valve.

11 Claims, 1 Drawing Sheet

SHROUD AND COMBUSTION CHAMBER FOR AN INTERNAL COMBUSTION ENGINE

BACKGROUND

1. Field of the Invention

In general, the present invention relates to engine combustion chambers, and more particularly, the present invention relates to a shroud and combustion chamber for an internal combustion engine.

2. Description of the Related Art

Government regulations currently impose strict exhaust emission standards that require vehicle manufacturers to greatly reduce pollutants such as hydrocarbons (HC), oxides of nitrogen (NOx), and carbon monoxide (CO) emissions that may emanate from internal combustion engines. Although the operation of a number of combustion chamber devices are thought to be responsible for pollutants, it is generally thought that crevice volume fuel storage and release, via a vehicle's exhaust valves, plays a major role. During engine operation, unburned fuel may be released at the end of the exhaust stroke of the piston (when the piston is at top dead center) from out gassing of the ring and head gasket crevices. The unburnt fuel can then move out of the combustion chamber and escape into the vehicle's exhaust system; thereby being partially released into the atmosphere. One effective way to decrease the escape of these pollutants, within the purview of government standards, is the use of an exhaust shroud to divert the unburnt fuel back into the combustion chamber at the end of the exhaust stroke.

Various combustion chambers have been proposed that provide high compression ratios, high air fuel ratios, and fast mass burn rate while minimizing undesirable exhaust emissions. U.S. Pat. No. 4,452,221 granted to Keating, discloses a subchamber that is formed in a cylinder head. The subchamber consists of two small circular subcylinders adjoining and overlapping in such a way as to form a "figure eight" shaped recess. The concave walls direct swirl flows of a fuel-air mixture toward a vertical center of the subchamber, which has the overall effect of establishing swirling turbulent flow, thereby enabling combustion of lean mixtures with high compression ratios and may result in improvements in fuel consumption rate and reduced emissions. Further, U.S. Pat. No. 4,706,622 granted to Cloke, discloses a partially masked swirl inducing inlet port for a combustion chamber.

The two patents identified above, fail to disclose the applicants' unique exhaust valve shroud shown in the drawings and described in detail hereafter. The exhaust shroud configuration in the engine combustion chamber includes a side edge portion which under a relatively higher valve lift operative state cooperates with a peripheral edge portion of the exhaust valve head to block the flow of exhaust laden with unburned hydrocarbons commonly found adjacent the engine cylinder wall from being directed into an exhaust port. Specifically, it is known that unburned hydrocarbons congregate in the annulus defined by the relatively cool walls of the cylinder bore and the upper cylindrical wall portion of the piston. Moreover, applicants' are unaware of any prior patents or other prior art that teach or even suggest an exhaust shroud structure for flowing exhaust gases into an exhaust port by means of formation of a gap or flow channel formed between a side surface of the shroud and the peripheral edge portion of the head of the exhaust valve. This construction permits relatively normal free-flow whenever the operative position of the exhaust valve is less than in a fully opened state. These patents and any other prior art known to applicants' also do not disclose an exhaust shroud configuration that is so versatile as the subject structure in promoting changing of the flow rate and characteristic past the exhaust valve head during the exhaust cycle of operation by the ability to vary the size and shape of the side wall defined by the exhaust shroud.

SUMMARY OF THE INVENTION

The present invention eliminates the oversights and difficulties of the prior art by providing a unique shroud for a combustion chamber of an internal combustion engine. The combustion chamber includes a cylinder that has an exhaust port defining an exhaust passageway and an exhaust valve partially disposed within the exhaust port. The exhaust valve has an exhaust head with a peripheral edge. A valve seat is disposed within the exhaust port, which has a closed, a low lift, and a high lift position. A cylinder wall is formed within an engine block to encase a piston, which is slidably received within the cavity and is surrounded by the cylinder wall.

The shroud is formed below the exhaust port and generally has a lower edge portion and a side edge portion. This shroud configuration promotes a relatively free flow of exhaust gases past the exhaust valve and into the exhaust port during most of the exhaust stroke cycle by creating a gap or channel between the shroud's side edge portion and the adjacent peripheral edge portion of the exhaust valve's head. Specifically, the gap or channel is open to flow exhaust soon after the exhaust valve begins to open and almost until the valve reaches its fully opened position. As the piston moves upward in the cylinder bore and comes closer to the exhaust valve later in the exhaust cycle, the peripheral edge portion of the valve moves into substantial alignment with the lower edge portion of the shroud structure. This alignment closes-off the gap or channel to direct flow from the area of the combustion chamber immediately below the shroud whcih is adjacent the cooler cylinder wall and is known as an area in which a relatively hight proportion of unburned hydrocarbons congregate. Thus, when the piston is closer to the shroud and the exhaust valve is fully opened, the flow of exhaust from an area next to the cylinder wall is effectively prevented from directly flowing upward and into the exhaust port but instead is deflected by the underside of the valve toward the midportion of the combustion chamber. Desirabley, several different configurations of the shroud side wall create a variety of channel configurations for flow except when the valve is clsoe to its fully open condition.

Other objects, features and advantages of the present invention will become apparent by reference to the following detailed description when considered in conjunction with the accompanying drawings.

BRIEF DESCRIPTION OF THE DRAWINGS

In the drawings below, reference characters refer to like parts throughout the views, and wherein.

DESCRIPTION OF THE PREFERRED EMBODIMENT(S)

Figure 1:
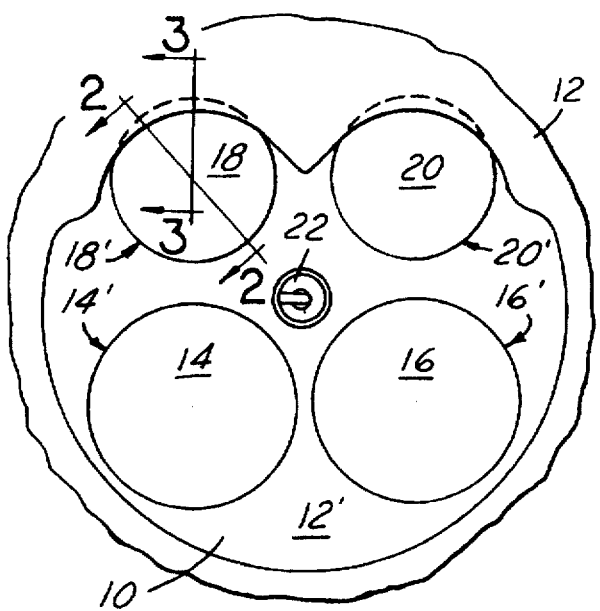
FIG. 1 is a planar view looking upward from a top face portion of a piston and looking toward a combustion chamber dome formed by a cylinder head assembly.
Figure 2:
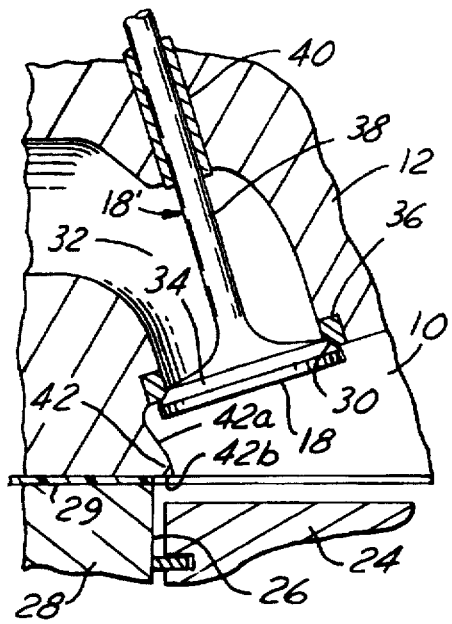
FIG. 2 is a cross-sectional view of one exhaust valve when in a closed operative position and of an associated exhaust port taken along sight line 2—2 of FIG. 1.

A combustion chamber 10 for an internal combustion engine is shown in FIGS. 1 and 2. The combustion chamber 10 is partially defined by an upwardly domed surface 12' formed in a cylinder head 12. The domed surface 12' is substantially co-planar with enlarged head portions 14' and 16' of first and second intake valves 14 and 16 and head portions 18' and 20' of first and second exhaust valves and 20. Also, the inner electrode carrying end portion of a spark plug 22 is shown exposed to the combustion chamber 10 to selectively ignite a mixture of air and fuel within the combustion chamber. The fuel/air ignition occurs during a power stroke or cycle of the engien while the fuel/air is in a compressed state caused by an upward movement of a piston 24 in a cylinder bore 26. Cylinder bore 26 is formed within an engine block 28 and the piston 24 is slidably received therein permitting its reciprocal movement upwards and downwards as is well known in the engine art. Between the cylinder head assembly 12 and the engine block 28, a head gasket member 29 is positioned and compressed by the multiple fastener connection (not shown) of the cylinder head 12 to the engine block 28.

Figure 3:
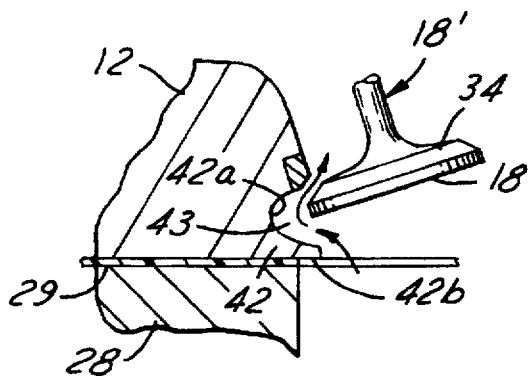
FIG. 3 is a cross-sectional view of the same exhaust valve when moved to a partially opened operative position and of the exhaust port revealing the flow of exhaust gases escaping the combustion chamber through a channel fromed between a side edge portion of a shroud and a peripheral edge of an adjacent exhaust valve head taken along sight line 3—3 of FIG. 1.
Figure 4:
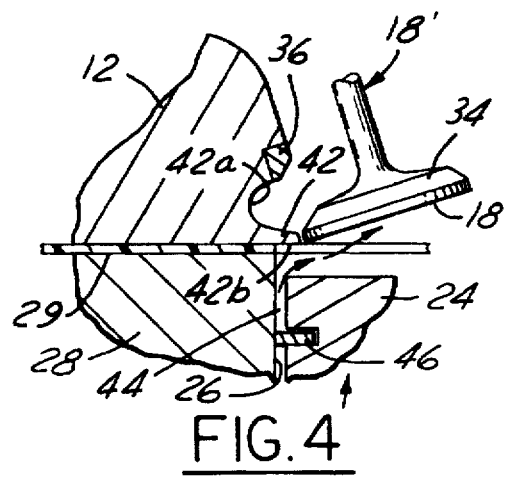
FIG. 4 is a cross-sectional view of the same exhaust valve when moved to a more opened operative position with an upper portion of a piston moved nearer to the cylinder head and showing a flow of exhaust from an area between the cylinder bore and the piston being diverted by aligned portions of the shroud and the exhaust valve toward teh central region of the combustion chamber.

As seen in FIGS. 2–4, cylinder head assembly 12 defines an opening or exhaust throat 30 between the combustion chamber 10 and an exhaust passage or port 32. Throat 30 and port 32 transmit exhaust gases away from the combustion chamber 10 during the exhaust cycle of engine operation. When the exhaust valve 18 is closed, its head portion 18' is disposed across the exhaust throat 30 to inhibit any flow of exhaust gases from the combustion chamber 10. The head portion 18' of the exhaust valve 18 has a peripheral edge with a straight or cylindrical edge 34 and an angled portion 34'. The angled edge portion 34' is adapted to engage a similarly configured surface formed on a valve seat member 36. In FIG. 3, the exhaust valve 18 has been moved from the closed position shown in FIG. 2 to a partially opened (or more opened) operative position. Finally, as movement of the piston approaches closer to the cylinder head 12, exhaust valve 18 moves toward a fully opened operative position.

As shown in FIG. 2, the exhaust valve 18 has an elongated valve stem portion 38 extending away from the enlarged head portion 18'. Stem portion 38 projects through a bore formed in a valve guide member 40 mounted in the cylinder head assembly. The valve guide allows the valve to reciprocate between the closed operative position and the opened operative position. Specifically, the valve stem 38 slides within the guide member 40 from the closed position as shown in FIG. 2 to more opened positions shown in FIGS. 3 and 4. The valve is moved in according with the causative effect of a lobe of a rotating camshaft as is well known in the engine art.

As best understood by reference to FIGS. 2–4, the cylinder head assembly 12 carries an inward projection 42 positioned adjacent to the valve head 18 which acts to shroud the valve under certain operative conditions. The shroud 42 has a curved side surface or edge portion 42a extending from the throat forming seat member 36 and then a lower surface or edge portion 44b extending from surface 42a. Although surfaces 42a and 42b are curved, they define generally about a ninety degree angle therebetween as is evident from FIG. 3. Obviously, this specific angle is not required. This angular relation defines a gap or channel 43 between the surfaces 42a, 42b and the valve's edge portion 34 fda when the valve is in a partially opened condition. The channel 43 allows a relatively free flow of exhaust gas from the combustion chamber 10 past the head 18' of the valve.

During operation of the engine and specifically a power cycle, spark plug 22 is energized to ignite a mixture air and fuel. During the power cycle, the expanding gas from the combustion drives the piston downward in cylinder bore 26. During the power cycle, the valves 14, 16, 18, and 20 are in substantially closed. Accordingly, the combustion chamber 10 is isolated from intake ports (not shown) and from the exhaust ports 32. Near the end portion of the power stroke the downwardly moving piston approaches its lowest position in the cylinder bore 26 (the BDC or bottom dead center position). Prior to BDC, the exhaust valve 18 begins to open the combustion chamber to exhaust port 32. The piston begins to move upwards in the cylinder bore 26 after the end of the power cycle. This upwards movement defines an exhaust cycle of the engine. The partial opening of the exhaust valve 18 to an intermediate or lower lift position as seen in FIG. 3 permits a flow of exhaust from the combustion chamber 10 to exhaust port 32, through the throat 30 as shown by arrows in the view. During the relatively early portion of the exhaust cycle shown in FIG. 3, exhaust passes directly by the edge portion of the head gasket 29, then around the lower edge portion 42b of the shroud, then along its curved side surface 42a, then past the valve's head potion 18', and finally through throat 30 into the exhaust port 32. The curved side surface 42a encourages a relatively free-flow of exhaust gases from combustion chamber 10 into port 32 by creating the previously identified flow channel 43 formed between curved side surface 42a and the peripheral edge 34 of exhaust head portion 18.

Now referring to FIG. 4, the exhaust valve's head 18' is shown in a more opened state as it approaches its fully opened condition. The more opened state occurs during a portion of the exhaust cycle when the piston 24 has moved upward toward the cylinder head 12. Close to the end of the exhaust cycle, the piston reaches its uppermost position (the TDC or top dead center). It is before this later portion of the exhaust cycle that exhaust gases from a space 44 adjacent to and above the piston ring 46 are forced upward along cylinder wall 26 by the moving piston. It is known that the exhaust from this region has a relatively high portion of unburned hydrocarbons present and it would be desirable if this portion of the exhaust flow does not directly flow into the throat 30. During the stage of the exhaust stroke, shown in FIG.4, the valve's edge portion 34 is positioned in essential alignment with the portion 42b of the shroud 30. This alignment closes off the gap or flow channel 43 along a portion of the valve head's circumference adjacent the cylinder wall 26. Resultantly, the flow of exhaust gases rich in unburned hydrocarbons is inhibited from passing directly to the throat 30. Note that in FIG. 4 the flow arrows show exhaust rich in unburned hydrocarbons being directed toward the midportion of the combustion chamber. This increases the likelihood that this exhaust will be naturally recirculated and retained in the combustion chamber for another cycle. This action defines a somewhat natural exhaust gas recirculation process which is beneficial in that it tends to decrease formation of nitrogen oxides. If the shroud 30 were absent, unburned hydrocarbon rich exhaust would pass directly into the exhaust port 32.

Figure 5:
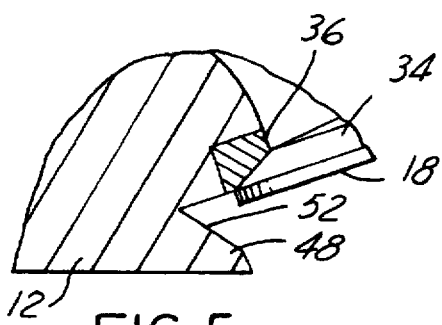
FIG. 5 is cross-sectional view of an exhaust valve in a closed operative position with a a V-shaped configuration of the shroud to form a different flow channel.

An alternate second shroud configuration 48 is shown in FIG. 5, wherein a groove 50 is formed creating a generally V-shaped channel 52 disposed in a substantially perpendicular relationship with the top surface of the piston 24 for flow of exhaust during the earlier stage of the exhaust stroke. It has been determined that different size shrouds and shapes of gaps or channels may be employed in the present invention to change the rate of flow and direction of exhaust gasses around the valve head 18' during a portion of the exhaust cycle.

Figure 6:
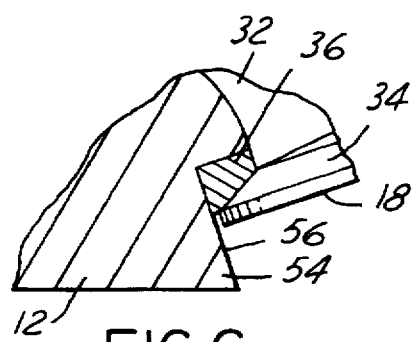
FIG. 6 is a cross-sectional view of an exhaust valve in a closed operative position with a straight side edge portion of the shroud.

An alternate third shroud configuration 54 is shown in FIG. 6 wherein the surface or face 56 thereof is straight so that essentially no flow channel is created as the valve head 18' moves from its closed position to its opened position. With this third embodiment, the flow of exhaust gases around the exhaust valve head 18' is decreased as compared to the first and second embodiments of FIGS. 2–5.

Although other specific configurations of the shroud and channels thus created, it is appreciated by those in the art that other configurations could be made to increase or decrease the flow characteristics of the exhaust gases from the combustion chamber to the exhaust passageway. Thus, while the invention has been described in detail above, it is to be expressly understood and it will be apparent to persons skilled in the relevant art that the invention is subject to be modified without departing from the spirit of the invention. Therefore, the above mentioned description is to be considered exemplary, rather than limiting, and the true scope of the invention is that defined in the following claims.

What is claimed is:

1. An exhaust shroud in a combustion chamber of an internal combustion engine having an engine block defining a cylinder bore for mounting a movable piston therein adapted to reciprocate in the cylinder bore, a cylinder head assembly with an exhaust throat connected to an exhaust port to transport exhaust out from the combustion chamber, an exhaust valve having a head portion disposed across the exhaust throat when in a closed operative position and defining a peripheral edge, wherein the exhaust valve is selectively moved from a closed position, through intermediate partially opened positions to a fully opened position, the exhaust shroud comprising:

a portion of the cylinder head assembly forming an exhaust valve shroud which projects into the combustion chamber and is spaced with respect to the exhaust valve's head portion, said shroud having a side surface cooperative with the peripheral edge portion of said exhaust valve head portion to inhibit flow of exhaust therebetween under some portions of the engine's operating cycle as the piston moves toward the cylinder held assembly and whereby the inhibited exhaust flow has undesirably high quantities of unburned hydrocarbons originating in a region of the combustion chamber between the piston's upper portion and the encircling surface of the cylinder bore.

2. The projecting shroud of claim 1 wherein a flow channel is formed in the cylinder head between said side surface of said shroud and said peripheral edge of a partially opened exhaust valve for flowing exhaust gases from the combustion chamber into the exhaust throat whenever the piston is spaced away from the cylinder head and the exhaust valve is only partially opened.

3. The projecting shroud of claim 2 wherein the configuration of said side surface of the shroud portion is curved to create a channel for the ready flow of exhaust gas therebetween.

4. The projecting shroud of claim 2 wherein the configuration of said side surface of the shroud portion has a V-shape to create a channel for the ready flow of exhaust gas therebetween.

5. A combustion chamber of an internal combustion engine having an exhaust valve shroud structure, the engine having an engine block defining a cylinder bore for mounting a movable piston therein adapted to reciprocate in the cylinder bore, a cylinder head assembly with an exhaust throat connected to an exhaust port to transport exhaust out from the combustion chamber, an exhaust valve having a head portion disposed across the exhaust throat when in a closed operative position and defining a peripheral edge, wherein the exhaust valve is selectively moved from a closed position, through intermediate partially opened positions, to a fully opened position, the combination combustion chamber and exhaust shroud comprising:

said cylinder head carrying a projection into said combustion chamber and spaced adjacent to said valve head for defining an exhaust valve shroud, said exhaust shroud having a side surface cooperative with said exhaust valve head's peripheral edge to inhibit flow of exhaust between said side surface and said peripheral edge during a portion of the engine's operating cycle, wherein passage of exhaust rich in unburned hydrocarbons from the region of the combustion chamber adjacent the cylinder wall is directed away from said exhaust throat;

a portion of the cylinder head assembly forming an exhaust valve shroud which projects into the combustion chamber and is spaced with respect to the exhaust valve's head portion, said shroud having a side surface cooperative with the peripheral edge portion of said exhaust valve head portion to inhibit flow of exhaust therebetween under some portions of the engine's operating cycle as the piston moves toward cylinder head assembly and whereby the inhibited exhaust flow has undesirably high quantities of unburned hydrocarbons originating in a region of the combustion chamber between the piston's upper portion and the encircling surface of the cylinder bore.

6. The combination combustion chamber and exhaust valve shroud of claim 5 wherein a flow channel is formed in the cylinder head between said side surface and said peripheral edge of a partially opened exhaust valve for flowing exhaust gases from the combustion chamber into the exhaust throat whenever the piston is spaced away from the cylinder head assembly and the exhaust valve is only partially opened.

7. The combination combustion chamber and exhaust valve shroud of claim 6 wherein the configuration of said side surface of the shroud portion is curved to create a channel for the ready flow of exhaust therebetween.

8. The combination combustion chamber and exhaust valve shroud of claim 6 wherein the configuration of said side surface of the shroud portion is V-shaped to create a channel for the ready flow of exhaust therebetween.

9. A shrouded type combustion chamber for an internal combustion engine having an engine block defining a cylinder bore for mounting a movable piston therein adapted to reciprocate in said cylinder bore, a cylinder head assembly with an exhaust throat connected to an exhaust port to transport exhaust out from the combustion chamber, an exhaust valve having a head portion disposed across the exhaust throat when in a closed operative position and defining a peripheral edge, wherein the exhaust valve is selectively moved from a closed operative position, through intermediate partially opened positions, to a fully opened position, the shrouded combustion chamber comprising:

a generally semi-circular shroud portion of said cylinder head assembly projecting into said combustion chamber and being disposed adjacent to and below said exhaust throat, said shroud portion defining a surface, said shroud and said peripheral edge portion of said valve head cooperating to inhibit flow of exhaust gases therebetween during portions of the engine's operative cycle as the piston moves toward the cylinder head assembly and whereby the inhibited exhaust flow has undesirably high quantities of unburned hydrocarbons originating in a region of the combustion chamber between the piston's upper portion and the encircling surface of the cylinder bore.

10. The shrouded combustion chamber as set forth in claim 9 wherein said surface of said exhaust shroud has a curved configuration to create a passage for flow of exhaust between the surface and the peripheral edge of the exhaust valve.

11. The shrouded combustion chamber as set forth in claim 9 wherein said surface of said exhaust shroud has a V-shaped configuration to create a passage for flow of exhaust between the surface and the peripheral edge of the exhaust valve.

* * * * *